(12) United States Patent
Levesque et al.

(10) Patent No.: US 10,185,986 B2
(45) Date of Patent: Jan. 22, 2019

(54) SYSTEMS AND METHODS FOR LOCATION-BASED NOTIFICATIONS FOR SHOPPING ASSISTANCE

(71) Applicant: Immersion Corporation, San Jose, CA (US)

(72) Inventors: Vincent Levesque, Montreal (CA); Alex Zhu, Verdun (CA); Eric Gervais, Montreal (CA); Fengtian An, Montreal (CA); Johnny N. Maalouf, Montreal (CA); Eric Lajeunesse, Saint-Hubert (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/851,140

(22) Filed: Sep. 11, 2015

(65) Prior Publication Data

US 2017/0076361 A1 Mar. 16, 2017

(51) Int. Cl.
*G06Q 30/00* (2012.01)
*G06Q 30/06* (2012.01)

(52) U.S. Cl.
CPC ..... *G06Q 30/0639* (2013.01); *G06Q 30/0633* (2013.01)

(58) Field of Classification Search
CPC ............ G06Q 30/0639; G06Q 30/0633; G06F 17/3087
USPC ................................. 705/26.8, 26.9
See application file for complete search history.

(56) References Cited

U.S. PATENT DOCUMENTS

| 6,792,398 | B1 * | 9/2004 | Handley ................. | G06F 3/016 345/419 |
|---|---|---|---|---|
| 8,930,134 | B2 | 1/2015 | Gu et al. | |
| 2003/0032436 | A1 | 2/2003 | Mikuni | |
| 2006/0236257 | A1 | 10/2006 | Othmer | |
| 2007/0268392 | A1 | 11/2007 | Paalasmaa et al. | |
| 2009/0171568 | A1 * | 7/2009 | McQuaide, Jr. ....... | G01C 21/36 701/411 |
| 2009/0231277 | A1 * | 9/2009 | Peterson ................. | G06F 3/016 345/157 |
| 2012/0050324 | A1 * | 3/2012 | Jeong ...................... | G06F 17/30 345/633 |
| 2012/0158538 | A1 * | 6/2012 | Roh ....................... | G06Q 30/06 705/26.7 |
| 2012/0176525 | A1 | 7/2012 | Garin et al. | |
| 2013/0124362 | A1 * | 5/2013 | Katcher ............. | G06Q 30/0633 705/26.8 |

(Continued)

FOREIGN PATENT DOCUMENTS

WO 2006070047 7/2006

*Primary Examiner* — Yogesh C Garg
*Assistant Examiner* — Lalith M Duraisamygurusamy
(74) *Attorney, Agent, or Firm* — Kilpatrick Townsend & Stockton LLP

(57) ABSTRACT

Methods, systems, and devices are described for location-based notifications for shopping assistance. One disclosed method includes the steps of receiving a list of items for a shopping list; obtaining a location of at least one of the items in the list; responsive to a determination that a proximity of a user device to the location is within a threshold proximity of the location: generating a notification signal based on the proximity of the user device to the location; and outputting the notification signal to cause the user device to output a notification.

20 Claims, 7 Drawing Sheets

(56) References Cited

U.S. PATENT DOCUMENTS

| | | | | |
|---|---|---|---|---|
| 2013/0293682 A1* | 11/2013 | Zouda | ............... | G03B 17/20 |
| | | | | 348/46 |
| 2014/0074950 A1* | 3/2014 | Fan | ............... | H04L 51/20 |
| | | | | 709/206 |
| 2015/0189056 A1* | 7/2015 | Magi | ............... | G06F 1/1652 |
| | | | | 455/566 |
| 2016/0014483 A1* | 1/2016 | Jha | ............... | H04Q 9/00 |
| | | | | 340/870.07 |
| 2016/0033619 A1* | 2/2016 | Calvarese | ............... | G01S 5/26 |
| | | | | 367/125 |
| 2016/0132949 A1* | 5/2016 | Adoni | ............... | G06Q 30/0261 |
| | | | | 705/26.41 |

\* cited by examiner

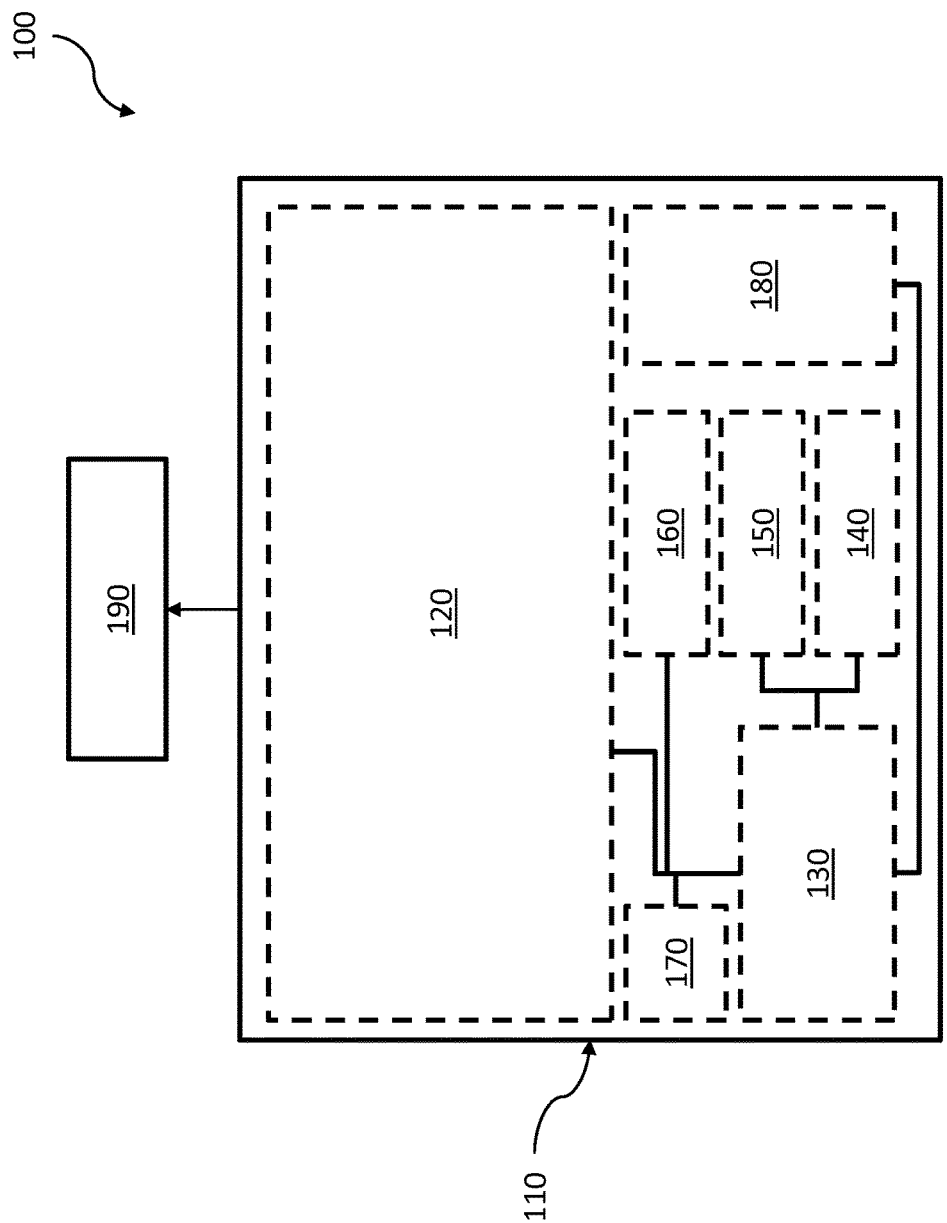

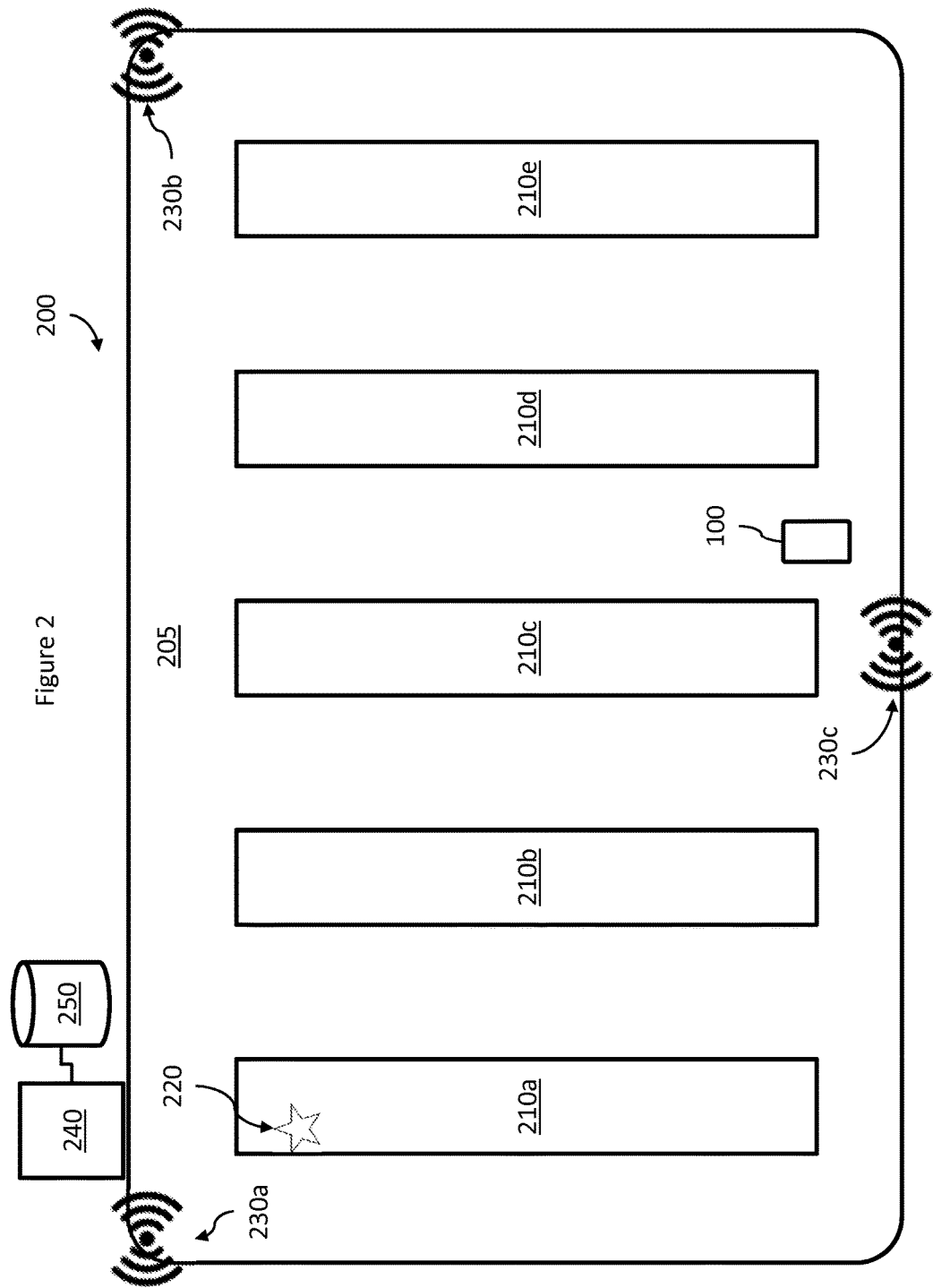

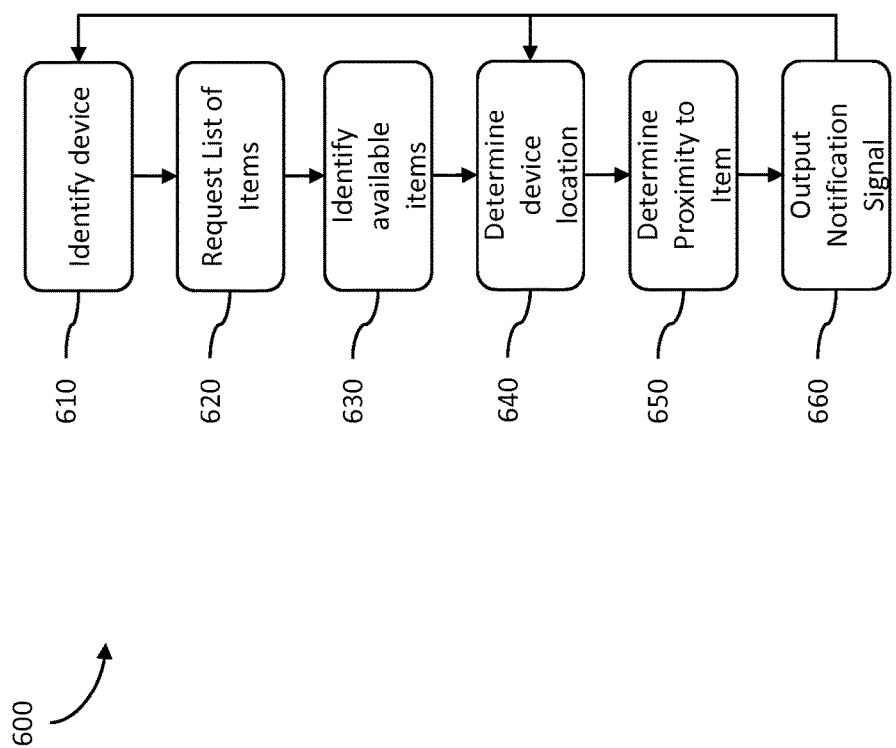

SYSTEMS AND METHODS FOR LOCATION-BASED NOTIFICATIONS FOR SHOPPING ASSISTANCE

FIELD

The present disclosure generally relates to location-based notifications and more specifically relates to systems and methods for location-based notifications for shopping assistance.

BACKGROUND

The use of mobile devices has become ubiquitous. People use their mobile devices for myriad tasks, including texting, social media, taking pictures, making phone calls, and shopping. While shopping via Internet sites has become increasingly popular, people continued to shop at so-called "brick and mortar" stores, such as grocery stores. Locating desired items within such stores can be difficult. Thus, stores will frequently provide signs to assist shoppers looking for items within the store. For example, grocery stores will often provide signs at each aisle providing general categories of items available within the aisle, such as "baking goods," "international," "sauces," etc. However, because items frequently belong to multiple different categories, e.g., a shopper searching for pasta sauce may reasonably look in aisles identified as "international," "pasta," and "sauces" before locating the item. As a result, a shopper may have difficulty locating specific items and may either ask for assistance from store personnel or simply wander around the store looking for the item. In addition, while looking for a particular item, the shopper may inadvertently or unknowingly walk by other items on their shopping list and later need to return to the location to obtain that item.

SUMMARY

Various examples are described for systems and methods for location-based notifications for shopping assistance. For example, one disclosed method comprises receiving a list of items in a shopping list; obtaining a location of at least one of the items in the list; responsive to a determination that a proximity of a user device to the location is within a threshold proximity of the location: generating a haptic signal based on the proximity of the user device to the location; and output the haptic signal to a haptic output device to cause the haptic output device to output a haptic effect. Further, a computer-readable medium may comprise program code for causing a processor to perform such a method.

One disclosed device comprises a non-transitory computer-readable medium; a sensor configured to output sensor signals; a haptic output device; and a processor in communication with the non-transitory computer-readable medium and the haptic output device, the processor configured to: access a list of items in a shopping list; obtain a location of at least one of the items in the list; determine a location of the device based at least in part on a sensor signal received from the sensor; in response to a determination that a proximity of the device to the location is within a threshold proximity of the location based on the determined location of the device: generate a haptic signal based on the proximity of the user device to the location; and transmit the haptic signal to the haptic output device to cause the haptic output device to output a haptic effect.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 1A-1B show an example device for location-based notifications for shopping assistance;

FIG. 2 shows an example system for location-based notifications for shopping assistance;

FIG. 6 shows an example method for location-based notifications for shopping assistance.

DETAILED DESCRIPTION

Figure 1A:
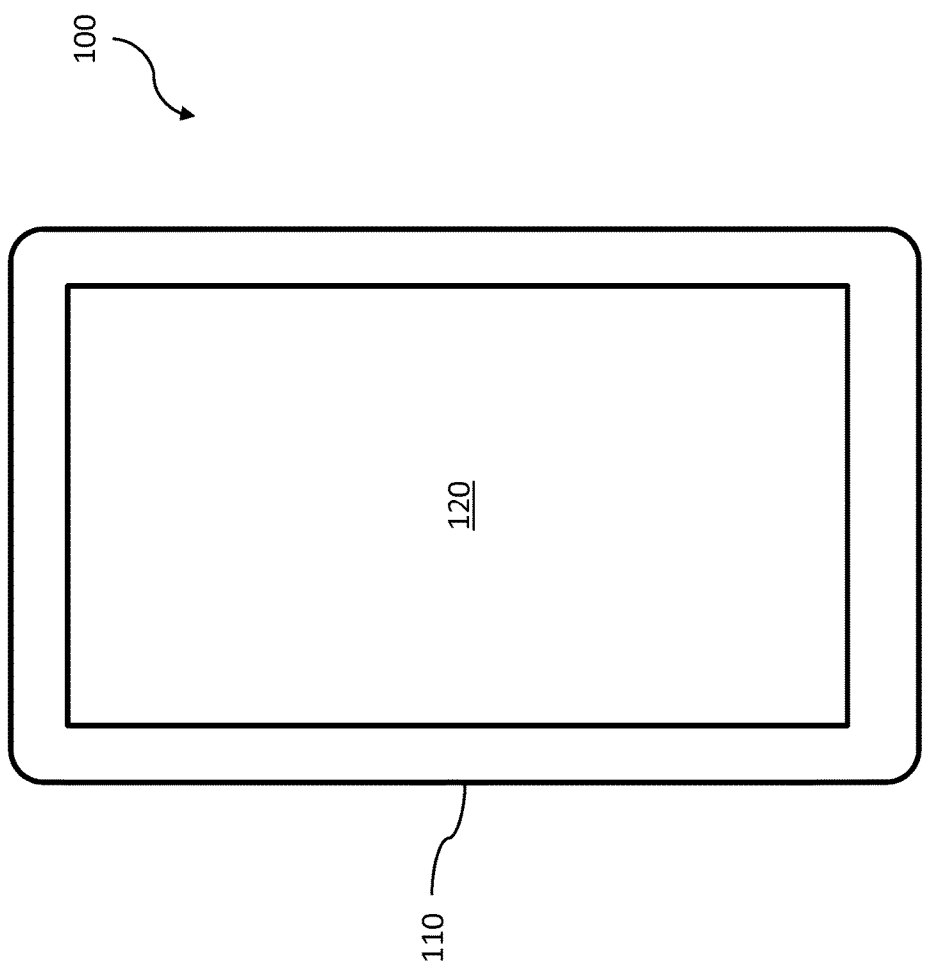

Examples are described herein in the context of systems and methods for location-based notifications for shopping assistance. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative System for Location-Based Notifications for Shopping Assistance In one illustrative example, a shopper enters a shopping list into a software application running on their mobile device before a trip to a home improvement store. After the shopper arrives at the store, the device detects its location and determines that it is within a store that has one or more items on the shopping list and outputs a brief haptic effect to indicate to the user that the software application has detected the arrival at the store and that it will begin assisting the shopper with locating items on her shopping list. The device then obtains information about the location of items within the store. In this example, the store is one store in a particular chain of home improvement stores that locates its products in approximately the same location in each of its stores. Thus, the software application accesses pre-loaded location information stored on the device's memory about the locations of the items within the shopper's shopping list. However, the software application is also configured to access information available on the Internet regarding a particular store's layout and arrangement of products, or to access a wireless network within a particular store to access product location information provided by the store.

In this example, because the device is moving inside of a building, the software application determines that its GPS signal is poor and thus identifies available WiFi access points to enable in-store positioning. The software application then begins to periodically update its location within the store and to update information about the direction and speed of the device's movement within the store.

As the shopper moves around the store, the software application determines and updates relative proximities to one or more items on the shopping list. If an item on the list is not available, or likely not available, for purchase within the store, the software application provides a visual cue on the shopping list to indicate that the item may not be available within the store, e.g., the software application has communicated with a computer system within the store and determined the item is out of stock, or was unable to locate the item at all. The software application also does not compute relative proximities for such items.

In this example, the software application also determines a layout of the store, such as the location of aisles within the store. In this example, the software application accesses the layout of the store stored in its memory. When the software application determines that the user is passing by an aisle, or enters an aisle, with one or more items on the list, it generates and outputs a haptic effect to indicate to the shopper that one or more items on the shopping list may be found within the aisle. As the shopper travels down the aisle, when the device's proximity to an item is within a first threshold, such as 10 feet, the device outputs a mild haptic effect to alert the shopper that an item is nearby. When the device's proximity to the item reduces to being within a second threshold, such as 5 feet, the device outputs a strong haptic effect to the alert the shopper that the item is likely within arm's reach of the shopper. In this example, if the user is unsure of which item the device 100 is indicating, she may view the screen of the device, which may show the shopping list and a visual indication of which item or items the user is near. The user may then select one of the items to obtain more detailed information about the item or about the item's location (e.g., whether the item is located on a higher or lower shelf, or which side of an aisle the item may be located on).

If the software application detects that the device's direction of travel and speed slows or stops, it may output an additional strong haptic effect to confirm that the shopper is near an item on the list. The software application then discontinues future haptic effects for that item because the software application determines that the shopper has likely located the item and acquired it. If other items on the shopping list remain to be located, the software application continues to determine relative proximities to other items on the list and continues to operate as described above. However, if all items available within the store have been acquired, the software application causes the device to output a distinctive haptic effect to indicate that all items on the list have been located and acquired.

It should be noted that in this illustrative example, and throughout the remainder of the specification, that while the term "shopping list" usually connotes a list of items to be purchased, its use within this specification is intended to be much broader. A shopping list herein relates to any list of items to be acquired, which may include books or other items from a library, items to pack for a trip, items on a "pick" list for retrieval from a warehouse or other inventory space, etc.

This illustrative example is given to introduce the reader to the general subject matter discussed herein and the disclosure is not limited to this example. The following sections describe various additional non-limiting examples and examples of systems and methods for location-based notifications for shopping assistance.

Referring now to FIG. 1A, FIG. 1A shows an illustrative device for location-based notifications for shopping assistance. In the example shown in FIG. 1A, the device includes a tablet 100 that has a touch-sensitive display screen 120 and a haptic output device (not shown) that is capable of outputting vibrational effects to the tablet's housing. The tablet 100 allows a user to execute a software application configured to receive a list of items in a shopping list, obtain a location of at least one of the items in the list, and in response to a determination that a proximity of the tablet 100 to the location is within a threshold proximity of the location, generate a haptic signal based on the proximity of the user device to the location, and output the haptic signal to the haptic output device to cause the haptic output device to output a haptic effect.

Referring now to FIG. 1B, FIG. 1B shows an example device for location-based notifications for shopping assistance. In the example shown in FIG. 1B, the device 100 comprises a housing 110, a processor 130, a memory 160, a touch-sensitive display 120, a haptic output device 140, one or more sensors 150, one or more communication interfaces 180, and one or more speakers 170. In addition, the device 100 is in communication with haptic output device 190, which may be optionally coupled to or incorporated into some embodiments. The processor 130 is in communication with the memory 160 and, in this example, both the processor 130 and the memory 160 are disposed within the housing 110. The touch-sensitive display 120, which comprises or is in communication with a touch-sensitive surface, is partially disposed within the housing 110 such that at least a portion of the touch-sensitive display 120 is exposed to a user of the device 100. In some embodiments, the touch-sensitive display 120 may not be disposed within the housing 110. For example, the device 100 may be connected to or otherwise in communication with a touch-sensitive display 120 disposed within a separate housing. In some example, the housing 110 may comprise two housings that may be slidably coupled to each other, pivotably coupled to each other or releasably coupled to each other.

In the example shown in FIG. 1B, the touch-sensitive display 120 is in communication with the processor 130 and is configured to provide signals to the processor 130 or the memory 160 and to receive signals from the processor 130 or memory 160. The memory 160 is configured to store program code or data, or both, for use by the processor 130, which is configured to execute program code stored in memory 160 and to transmit signals to and receive signals from the touch-sensitive display 120. In the example shown in FIG. 1B, the processor 130 is also in communication with the communication interface 180 and is configured to receive signals from the communication interface 180 and to output signals to the communication interface 180 to communicate with other components or devices such as one or more remote computers or servers. In addition, the processor 130 is in communication with haptic output device 140 and haptic output device 190, and is further configured to output signals to cause haptic output device 140 or haptic output device 190, or both, to output one or more haptic effects.

Furthermore, the processor 130 is in communication with speaker 170 and is configured to output signals to cause speaker 170 to output sounds. In various embodiments, the device 100 may comprise or be in communication with fewer or additional components or devices. For example, other user input devices such as a mouse or a keyboard, or both, or an additional touch-sensitive device may be comprised within the device 100 or be in communication with the device 100. As another example, device 100 may comprise and/or be in communication with one or more accelerometers, gyroscopes, digital compasses, and/or other sensors. A detailed description of the components of the device 100 shown in FIG. 1B and components that may be in association with the device 100 are described herein.

The device 100 can be any device that is capable of receiving user input and executing software applications. For example, the device 100 in FIG. 1B includes a touch-sensitive display 120 that comprises a touch-sensitive surface. In some embodiments, a touch-sensitive surface may be overlaid on the touch-sensitive display 120. In other embodiments, the device 100 may comprise or be in communication with a display and a separate touch-sensitive surface. In still other embodiments, the device 100 may comprise or be in communication with a display and may comprise or be in communication with other user input devices, such as a mouse, a keyboard, buttons, knobs, slider controls, switches, wheels, rollers, joysticks, other manipulanda, or a combination thereof.

In some embodiments, one or more touch-sensitive surfaces may be included on or disposed within one or more sides of the device 100. For example, in one example, a touch-sensitive surface is disposed within or comprises a rear surface of the device 100. In another example, a first touch-sensitive surface is disposed within or comprises a rear surface of the device 100 and a second touch-sensitive surface is disposed within or comprises a side surface of the device 100. In some embodiments, the system may comprise two or more housing components, such as in a clamshell arrangement or in a slidable arrangement. For example, one example comprises a system having a clamshell configuration with a touch-sensitive display disposed in each of the portions of the clamshell. Furthermore, in examples where the device 100 comprises at least one touch-sensitive surface on one or more sides of the device 100 or in examples where the device 100 is in communication with an external touch-sensitive surface, the display 120 may or may not comprise a touch-sensitive surface. In some embodiments, one or more touch-sensitive surfaces may have a flexible touch-sensitive surface. In other embodiments, one or more touch-sensitive surfaces may be rigid. In various embodiments, the device 100 may comprise both flexible and rigid touch-sensitive surfaces.

In various embodiments, the device 100 may comprise or be in communication with fewer or additional components than the example shown in FIG. 1B. For example, in one example, the device 100 does not comprise a speaker 170. In another example, the device 100 does not comprise a touch-sensitive display 120, but comprises a touch-sensitive surface and is in communication with a display. Thus, in various embodiments, the device 100 may comprise or be in communication with any number of components, such as in the various examples disclosed herein as well as variations that would be apparent to one of skill in the art.

The housing 110 of the device 100 shown in FIG. 1B provides protection for at least some of the components device 100. For example, the housing 110 may be a plastic casing that protects the processor 130 and memory 160 from environmental conditions, such as rain, dust, etc. In some embodiments, the housing 110 protects the components in the housing 110 from damage if the device 100 is dropped by a user. The housing 110 can be made of any suitable material including but not limited to plastics, rubbers, or metals. Various examples may comprise different types of housings or a plurality of housings. For example, in some embodiments, the device 100 may be a portable device, handheld device, toy, gaming console, handheld video game system, gamepad, game controller, desktop computer, e-book reader, portable multifunction device such as a cell phone, smartphone, personal digital assistant (PDA), laptop, tablet computer, digital music player, etc.

In some examples, the device 100 may be embedded in another device such as a wrist watch, a virtual-reality headset, other jewelry, such as bracelets, wristbands, rings, earrings, necklaces, etc., gloves, eyeglasses, augmented-reality ("AR") devices, such as AR headsets, or other wearable device. Thus, in some examples, the device 100 is wearable. In one example, the device 100, such as a wearable device, does not comprise a display screen, but instead may comprise one or more notification mechanisms, such as one or more lights, such as one or more individual LEDs, one or more haptic output devices, one or more speakers, etc. Such a device 100 may be configured to generate one or more notifications to a user using one or more such notification mechanisms.

In the example shown in FIG. 1B, the touch-sensitive display 120 provides a mechanism to allow a user to interact with the device 100. For example, the touch-sensitive display 120 detects the location or pressure, or both, of a user's finger in response to a user hovering over, touching, or pressing the touch-sensitive display 120 (all of which may be referred to as a contact in this disclosure). In one example, a contact can occur through the use of a camera. For example, a camera may be used to track a viewer's eye movements as the user views the content displayed on the display 120 of the device 100, or the user's eye movements may be used to transmit commands to the device, such as to turn a page or to highlight a portion of text. In this example, haptic effects may be triggered based at least in part on the viewer's eye movements. For example, a haptic effect may be output when a determination is made that the viewer is viewing content at a particular location of the display 120. In some embodiments, the touch-sensitive display 120 may comprise, be connected with, or otherwise be in communication with one or more sensors that determine the location, pressure, a size of a contact patch, or any of these, of one or more contacts on the touch-sensitive display 120. In some embodiments, the touch-sensitive display 120 may comprise a multi-touch touch-sensitive display that is capable of sensing and providing information relating to a plurality of simultaneous contacts. For example, in one example, the touch-sensitive display 120 comprises or is in communication with a mutual capacitance system. Some examples may have the ability to sense pressure or pseudo-pressure and may provide information to the processor associated with a sensed pressure or pseudo-pressure at one or more contact locations. In another example, the touch-sensitive display 120 comprises or is in communication with an absolute capacitance system. In some embodiments, the touch-sensitive display 120 may comprise or be in communication with a resistive panel, a capacitive panel, infrared LEDs, photodetectors, image sensors, optical cameras, or a combination thereof. Thus, the touch-sensitive display 120 may incorporate any suitable technology to determine a contact on a touch-sensitive surface such as, for example, resistive, capacitive, infrared, optical, thermal, dispersive signal, or acoustic pulse technologies, or a combination thereof.

In the example shown in FIG. 1B, haptic output devices 140 and 190 are in communication with the processor 130 and are configured to provide one or more haptic effects. For example, in one example, when an actuation signal is provided to haptic output device 140, haptic output device 190, or both, by the processor 130, the respective haptic output device(s) 140, 190 outputs a haptic effect based on the actuation signal. For example, in the example shown, the processor 130 is configured to transmit a haptic output signal to haptic output device 140 comprising an analog drive signal. In some embodiments, the processor 130 is configured to transmit a high-level command to haptic output device 190, wherein the command includes a command identifier and zero or more parameters to be used to generate an appropriate drive signal to cause the haptic output device 190 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

A haptic output device, such as haptic output devices 140 or 190, can be any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a shape memory alloy, a pager, a DC motor, an AC motor, a moving magnet actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various examples may include a single or multiple haptic output devices and may have the same type or a combination of different types of haptic output devices.

In other embodiments, deformation of one or more components can be used to produce a haptic effect. For example, one or more haptic effects may be output to change the shape of a surface or a coefficient of friction of a surface. In an example, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some examples comprising haptic output devices 140, 190 that are capable of generating frictional or deformations, the haptic output devices 140 or 190 may be overlaid on the touch-sensitive display or otherwise coupled to the touch-sensitive display 120 such that the frictional or deformation effects may be applied to a touch-sensitive surface that is configured to be touched by a user. In some embodiments, other portions of the system may provide such forces, such as portions of the housing that may be contacted by the user or in a separate touch-separate input device coupled to the system. Co-pending U.S. patent application Ser. No. 13/092,484, filed Apr. 22, 2011, entitled "Systems and Methods for Providing Haptic Effects," the entirety of which is hereby incorporated by reference, describes ways that one or more haptic effects can be produced and describes various haptic output devices.

It will be recognized that any type of input synthesis method may be used to generate the interaction parameter from one or more haptic effect signals including, but not limited to, the method of synthesis examples listed in TABLE 1 below.

TABLE 1

METHODS OF SYNTHESIS

| Synthesis Method | Description |
| --- | --- |
| Additive synthesis | combining inputs, typically of varying amplitudes |
| Subtractive synthesis | filtering of complex signals or multiple signal inputs |
| Frequency modulation synthesis | modulating a carrier wave signal with one or more operators |
| Sampling | using recorded inputs as input sources subject to modification |
| Composite synthesis | using artificial and sampled inputs to establish a resultant "new" input |
| Phase distortion | altering the speed of waveforms stored in wavetables during playback |
| Waveshaping | intentional distortion of a signal to produce a modified result |
| Resynthesis | modification of digitally sampled inputs before playback |
| Granular synthesis | combining of several small input segments into a new input |
| Linear predictive coding | similar technique as used for speech synthesis |
| Direct digital synthesis | computer modification of generated waveforms |
| Wave sequencing | linear combinations of several small segments to create a new input |
| Vector synthesis | technique for fading between any number of different input sources |
| Physical modeling | mathematical equations of the physical characteristics of virtual motion |

In the example device in FIG. 1B, the sensor 150 is configured to generate one or more sensor signals that may be used to determine a location of the device 100. For example, the sensor 150 may comprise a GPS receiver. In some examples, the sensor 150 may be a WiFi component that is capable of receiving WiFi signals and providing those signals to the processor 130. In some examples, the sensor 150 may be one or more accelerometers or gyroscopes configured to detect a movement of the device 100. In some examples, the sensor 150 may be a camera that is configured to capture one or more images that may be used to determine a relative or absolute position of the device, such as by identifying an object in one or more of the images and estimating a range to the object, or by detecting one or more objects as landmarks and determining a location of the device 100 with respect to the one or more landmarks.

In the example device in FIG. 1B, the communication interface 180 is in communication with the processor 130 and provides wired or wireless communications from the device 100 to other components or other devices. For example, the communication interface 180 may provide wireless communications between the device 100 and a communications network. In some embodiments, the communication interface 180 may provide communications to one or more other devices, such as another device 100 and/or one or more other devices. The communication interface 180 can be any component or collection of components that enables the device 100 to communicate with another component, device, or network. For example, the communication interface 180 may comprise a PCI communication adapter, a USB network adapter, or an Ethernet adapter. The communication interface 180 may communicate using wireless Ethernet, including 802.11 a, g, b, or n standards. In one example, the communication interface 180 can communicate using Radio Frequency (RF), Bluetooth, CDMA, TDMA, FDMA, GSM, Wi-Fi, satellite, or other cellular or wireless technology. In other embodiments, the communication interface 180 may communicate through a wired connection and may be in communication with one or more networks, such as Ethernet, token ring, USB, FireWire 1394, fiber optic, etc. In some embodiments, device 100 comprises a single communication interface 180. In other embodiments, device 100 comprises two, three, four, or more communication interfaces.

Referring now to FIG. 2, FIG. 2 illustrates an example system 200 for location-based notifications for shopping assistance. In this example, the system 200 comprises a server 240, a data store 250, and a plurality of wireless stations 230a-c. The server 240 comprise a computer-readable medium and a processor and is in communication with the data store 250 and the wireless stations 230a-c. The data store 250 comprises location information for products located within a shopping location. The server 240 is configured to receive requests for the location information, and in response, to access and provide it to one or more devices, such as device 100. Within the store may be one or more items on the shopping list that are available for purchase or are otherwise acquirable by the user, such as item 220.

In this example, the wireless stations 230a-c comprise WiFi access points to enable access to one or more communication networks. For example, the retail store 205 may provide access to the Internet or to the server 240 to obtain information about the location of items within the retail store 205. In some examples, user devices may be equipped with the capability to determine location based on one or more wireless signals received from one or more wireless stations 230a-c. For example, the user devices may be configured to determine respective signal strengths of the wireless stations 230a-c at a particular location and to obtain information about the WiFi access points (such as SSID and MAC address) and their locations. One suitable WiFi positioning system may employ the AnyPlace system available at http://anyplace.cs.ucy.ac.cy/. The user device may then compute its location based at least in part on one or more of the locations of the respective wireless stations, the received information about the wireless stations, and signal strengths.

In some examples, the wireless stations 230a-c may not be WiFi access points but may comprise other wireless technologies, such as cellular femtocells, to enable a user device to determines its position based on one or more received signals from one or more of the wireless stations 230a-c. In some examples, the wireless stations 230a-c may comprise one or more Bluetooth™ beacons, such as one or more iBeacons. In one example, a Bluetooth™ beacon may broadcast one or more signals, that may comprise an identity of the beacon. And while this example shows a system 200 having three wireless stations 230a-c, other examples may comprise a greater number, or fewer, wireless stations. In some examples, the wireless stations 230a-c may instead be one or more cellular towers and may not be located within the retail store. In some such examples, user devices may be configured to determine their respective positions based on received signals from one or more cellular towers. For example, the user devices may be configured to employ trilateration to determine their respective positions. In some examples, a cellular network may be configured to determine a wireless device's position and provide the location to the wireless device.

In this example, the system 200 is configured for a shopping location that comprises a retail store 205 having a plurality of shelving units 210a-e arranged to create a plurality of aisles. Items for purchase, e.g., item 220, are located on the shelving units and may be obtained by shoppers within the retail store 205. Upon entering the retail store 205, a user may obtain a shopping cart with a cradle for a user device, or with a suitable device pre-installed in the shopping cart for use by the shopper. In either case, the device 100 must obtain position information about items for sale within the store. In this example, the user has previously created a shopping list and entered it into their device. In an example where the shopping cart has a pre-installed user device, the shopper may transfer their shopping list to the pre-installed user device using any suitable technique, such as near-field communication (NFC), Bluetooth communication, WiFi communication, or by removing a flash memory from the user's own device and inserting it into the pre-installed user device.

Once the user device has received a shopping list with one or more items for purchase, the user device 100 attempts to obtain positioning information for the items on the list. In this case, the user device 110 requests positioning information from the server 240, which then accesses the data store 250, and, for those items found in the data store 250, provides location information to the user device. The server 240 may also provide additional information to the user device 100, such as layout information about the retail store (e.g., aisle numbers, etc.), and other information, such as promotional information, coupon information, sales information, etc. The user device 100 receives the information from the server 240 and monitors its location as the shopper maneuvers through the retail store 205 and begins providing haptic feedback, as appropriate, to the shopper and the shopper approaches items, e.g., item 220, on the shopping list. Once the user is near the item, she may receive a notification that an item on the shopping list is nearby. A detailed description of methods for location-based notifications for shopping assistance are provided below.

In some examples, while a device 100 may be configured to determine its proximity to one or more items on a shopping list, the system 200 may be configured to detect the presence of a device, request information from the device about one or more items on a shopping list, determine a location of the device, and determine a proximity of the device to one or more items on the shopping list. For example, rather than (or as well as) the device 100 obtaining location information relating to items within a location, the system 200 may maintain or have access to such information, and may track a location of a device 100 within the location. For example, the system 200 may request location information from the device, or may determine the devices location based on triangulation using wireless stations 230a-c, or may have one or more short range beacons configured to communicate with a device 100 when the device 100 is within range of the beacon. If the system 200 determines that the device is within proximity of one or more items on the shopping list, the system 200 may transmit a signal to the device to cause the device to output one or more notifications to the user.

Figure 3:
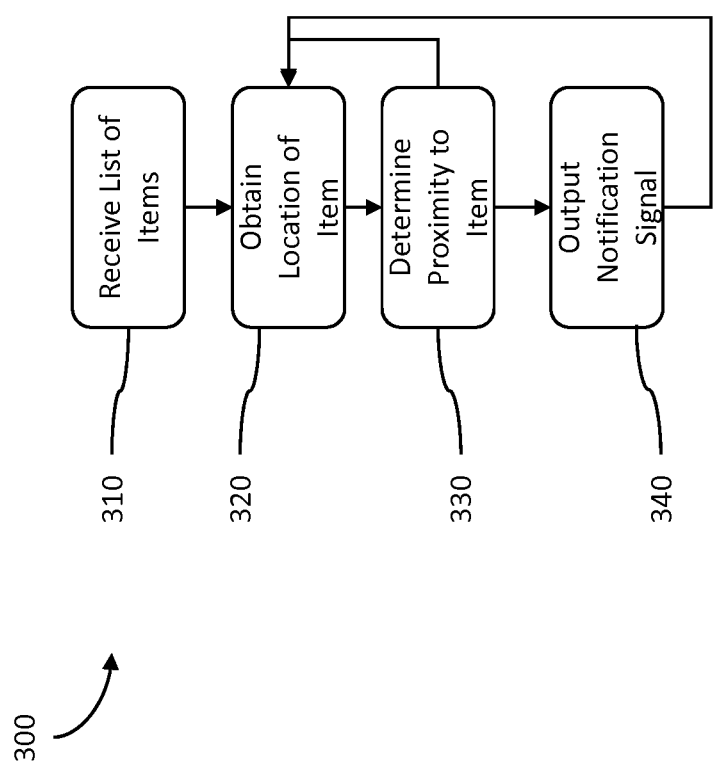
FIGS. 3-4 show example methods for location-based notifications for shopping assistance.

It should be noted that while the system 200 of FIG. 2 operates in a retail store environment in this example, there are many other types of suitable environments, such as shopping malls, warehouses, or other environments discussed herein. For example, a shopping mall, whether an open-air mall or a conventional interior shopping mall, may be a suitable environment. In such an environment, some example systems may provide locations of items on a shopping list and provide comparative pricing information for the item in different stores carrying the item within the shopping mall. Some suitable environments may comprise an entire city. For example, a shopper may enter a shopping list and simply begin running errands to stores typically used by the shopper. However, as he drives around running errands, the shopper's device may monitor its location and nearby stores and provide notifications when the shopper approaches a store having one or more items on the shopping list. In cases where the shopper is driving, the device may provide a haptic effect or an audible indication to the user. In one example, the device may use synthesized speech to inform the user of a nearby store and that one or more items on the shopping list may be obtained from the store. In some examples, the device may allow the user to ask for additional information, such as which specific items in the list may be obtained at the store, to which the device may respond with one or more of the items on the list. Still further examples are contemplated within the full scope of the present disclosure Referring now to FIG. 3, FIG. 3 shows an example method 300 for location-based notifications for shopping assistance. FIG. 3 is described with respect to a software application executed by the device 100 shown in FIGS. 1A-1B; however, this and other example methods according to this disclosure are not limited to execution by only the device 100 shown in FIGS. 1A-1B, but rather may be executed by any suitable electronic device.

The method 300 begins in block 310 when the device 100 receives a list of items for a shopping list. For example, a user may activate a software application and manually enter items into a shopping list, such as by typing in the names of the items. However, in some examples, the user may enter items into a shopping list by taking photos of advertisements for items or existing items within the user's home (e.g., a jar of spaghetti sauce). The software may use optical character recognition to identify the item based on a label, or image recognition to identify the item based on a logo, trademark, trade dress feature, etc. In some examples, the software may recognize or obtain glyphs, such as QR codes or bar codes, to identify an item for a shopping list. In some examples, the user may be able to identify items while browsing the internet and save them to the shopping list.

In some examples, the device 100 may receive a shopping list from another device. For example, a user may receive an email or other electronic communication comprising a shopping list, or one or more items to be added to a shopping list. In some examples, the device 100 may be configured to receive shopping lists, or items for a shopping list, from another device using a communications method such as NFC, Bluetooth, WiFi, cellular, or other wired or wireless networking method. In some examples, the device 100 may receive one or more items for a shopping list, or an entire shopping list, from a computer-readable medium within the device 100, or by a removable computer-readable medium, such as a flash memory. In some examples, the user may log into a device, such as by using a login name and password, or may enter any other identifying information, such as using fidelity card information, or a tag (e.g., RFID tag) supplied to the shopper by a store or other location that identifies the user. After the device 100 has received a list of items for a shopping list, the method 300 proceeds to block 320.

At block 320, the device 100 obtains a location of one or more items within the shopping list. In some examples, the device 100 may obtain locations of the one or more items from a particular store. For example, upon entering a store, the user may activate a shopping application on the user's device 100 that accesses the shopping list, determines the user's location to be within the store, and connects with a wireless network within the store. The device 100 then sends a request for location information to a server, such as server 240 provided by the store, and in response, receives location information for one or more items on the shopping list. In some examples, the device 100 may instead request such information from a website on the Internet associated with the store or a crowd-sourced store layout, or may access pre-loaded information stored within a memory of the device 100. If one or more items on the shopping list are not available in the store, the device 100 may provide a visual cue on the shopping list associated with the item to indicate that the item may not be available in the store. In some examples, the device 100 may attempt to obtain additional information about the items, such as prices for the items within the store, one or more coupons for items on the shopping list, information about whether the item is in-stock or out of stock, suggestions for additional items to add to the shopping list, or information about upcoming sales for one or more items on the shopping list.

If the device 100 determines that the user is within an environment such as a shopping mall, the device 100 may request information from one or more servers associated with the mall, or from a website on the Internet associated with the mall, to obtain information about stores available in the mall. The device 100 may then attempt to obtain information about the location of items within one or more of the stores at the mall, such as described above. In some examples, the device 100 may also obtain additional information, such as pricing information, availability of the item (e.g., whether in or out of stock), sales information, etc., as described above. If multiple stores offer one or more items on the list for sale, the device 100 may display the different prices and stores for a particular item to enable the user to determine from which store to purchase the item.

If the device 100 determines that the user is not at a particular shopping location, the device 100 may then attempt to obtain location information for items at different stores within a radius of the user's position. For example, the user may set a threshold radius of 3 miles, within which the device 100 may attempt to locate one or more stores that offer one or more items on the shopping list for sale. In addition, as described above, the device 100 may also attempt to obtain additional information, such as pricing information, immediate availability of the item, etc.

Location information for a particular item may comprise absolute location information, such as GPS coordinate information. Location information may comprise other types of location information, such as an aisle number, a shelf height, or based on a coordinate system established for a particular environment, such as within a store or a shopping mall.

Other types of location information may be suitably employed as well. After the device 100 obtains a location of at least one item in the shopping list, the method proceeds to block 330.

At block 330, the device 100 determines a proximity of the device 100. In one example, the device 100 maintains and updates its own position using one or more sensors within the device 100. For example, the device 100 may obtain its position from a GPS sensor. In some examples, the device 100 may determine its position from a cellular or WiFi network as described above. In some examples, the device 100 may determine its own position and orientation, such as its heading, or a direction and speed of travel Thus, in some examples, proximity may comprise a location, an orientation, a speed, or a velocity.

After determining its location, the device 100 determines a distance from the device's location to the location of one or more items on the shopping list. The device 100 may compute the distance using any known technique, including, such as, the Pythagorean theorem for location information provided in a two or three-dimensional coordinate system. In some examples, a distance to an item may be determined based on an available walking path to the item. Thus, if the item is on a shelf in an adjacent aisle, the user may be physically near the item (e.g., it is located on the opposite side of a nearby shelf), but may be a 50-foot walk from the item. In some examples, the location of the device 100 may be in a format that is incompatible with a location of an item on the shopping list. For example, if an item on a shopping list is pasta sauce, the location for the item may be "Aisle 4, upper shelf," while the device's location may be in GPS coordinates. In such a case, the device 100 may attempt to obtain GPS-compatible information for the item. In some cases, if the device 100 is not located at the store having the pasta sauce, the device 100 may instead obtain a GPS position for the store and determine a distance from the device 100 to the store. Subsequent to arriving at the store, the device 100 may then obtain its position according to the store's layout, such as by determining its location within an aisle or department of the store. At which point, the device 100 may then determine a proximity to the item.

In some examples, the device 100 may determine that it is in proximity of items that are potential substitutes for items on the shopping list. For example, if a user has listed a particular brand of soda on the shopping list, the device 100 may determine proximity to other brands of soda, which may later trigger different notifications to the user. In some examples, the device may be configured to only determine proximity to particular classes of items, such as organic meat or produce, or antibiotic free, free-range, etc., meat, but to not determine proximity to products that do not possess such qualities. Such qualities may be specified on a per-item basis, or may be a global setting available in a configuration setting(s) on the device 100. If the device 100 determines that it is within close proximity to an item on the shopping list, the method 300 proceeds to block 340. Otherwise, the method 300 returns to block 320.

At block 340, responsive to a determination that a proximity of a user device to the location is within a threshold proximity of the location, the device 100 generates a notification signal based on the proximity of the device 100 to the item's location and outputs the notification signal to cause the device 100 to output a notification. For example, as discussed above, the example device 100 includes a haptic output device 140. Thus, in one example, the device 100 generates a haptic signal and outputs the haptic signal to the haptic output device 140 to cause the haptic output device 140 to output a haptic effect. In some examples, an intensity or type of haptic effect may be adjusted by generating the haptic signal based on parameters, such as the relative proximity of the device 100 to the item, the number of items within a threshold proximity of the device 100, or the direction of travel of the device 100 (e.g., whether towards or away from an item, or if not moving while located near an item).

For example, as the device 100 enters within a threshold proximity to an item, the device 100 may generate and output a low intensity haptic effect comprising two pulses to indicate that the device 100 is now near an item on the list. As the device 100 continues to move closer to the item, the device 100 may iteratively generate a haptic signal and output haptic effects comprising a single pulse with increasing magnitude or frequency as the device 100 approaches the item. If the device 100 transitions from approaching an item to moving away from the item, the device 100 may generate a haptic signal and output a haptic effect having a high magnitude comprising three pulses to indicate that the user may have passed the item. In some examples, such as an example wherein the device 100 is coupled to a shopping or other cart, the device 100 may cause a haptic effect to be output by the cart, such as by a handle of the cart.

In some examples, the device 100 may output other types of notifications, either alone, or in combination with one or more haptic effects. For example, the device 100 may generate and output an audio signal, such as a beep or chime, or may generate and output synthesized speech to explain the user is approaching or near an item on the list, and may identify the item itself. In some examples, the device 100 may generate and output a visual notification, such as by flashing the screen of the device 100 or one or more lights, e.g., light-emitting diodes ("LEDs"), to indicate the user is near an item. In one example, a shopping cart may have a built-in device configured to use according to this disclosure. The device 100 may comprise three LEDs—one red, one yellow, and one green. When the device 100 determines that it is within proximity to an item on a shopping list, it may illuminate the yellow LED. When the user is within close proximity to the item, e.g., within 3 feet, the device 100 discontinues illuminating the yellow LED and illuminates the green LED. If the user passes the item without stopping, the device 100 may leave the green LED illuminated and flash the red LED several times to indicate that the user has passed the item. If the user stops near the item while the green LED is illuminated, the device 100 then discontinues the green LED and marks the item as "found" on the shopping list and discontinues tracking the location of the item.

In some examples, the notification signal may be generated based on an approach vector or may be configured to indicate a direction to an item, or to indicate which item on the shopping list the device 100 is currently near. In some examples, the notification signal may be generated based on a number, quantity, or size of an item to obtain.

As discussed above, in some examples, one or more substitute items for an item on a shopping list may be identified, such as from different brands. Or in some examples, certain criteria may be required, such as identifiers like "organic," etc. In some examples, a notification for an exact item on a shopping list may differ from a notification for a substitute item, such as a different brand or a generic substituted, or for an item possessing certain desirable (or undesirable) qualities, such as being organic, antibiotic free, etc. In some cases, rather than outputting a different notification, the device 100 may output additional notifications, such as outputting additional haptic effects, or combinations of haptic effects or other notifications.

After the device 100 has output the notification signal, the method 300 returns to block 320 to iterate through the method another time.

Figure 4:
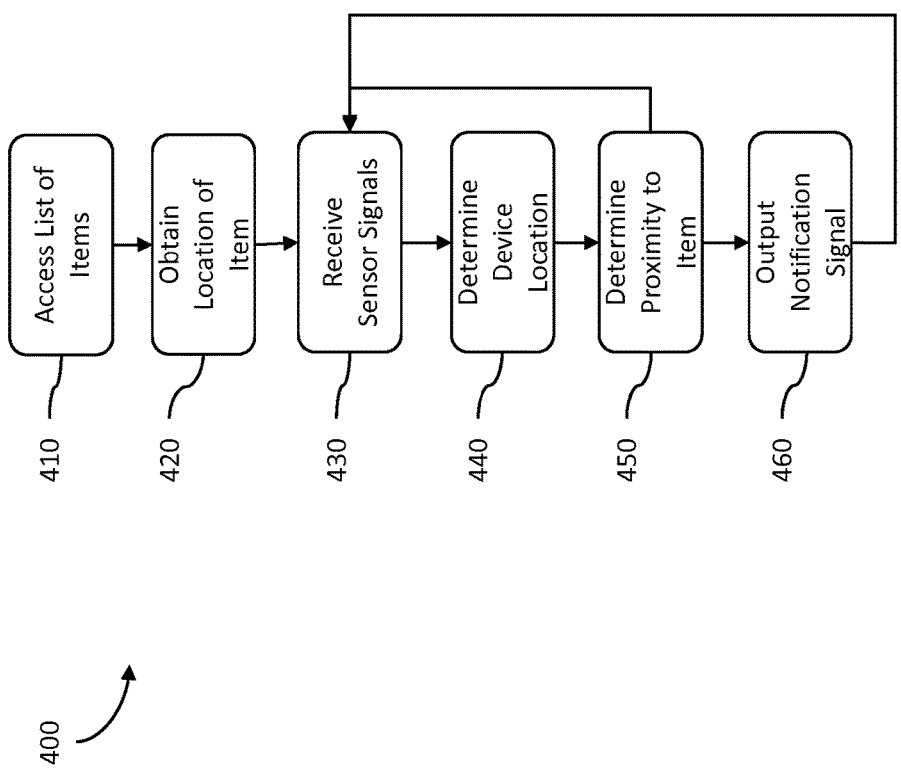

Referring now to FIG. 4, FIG. 4 shows an example method 400 for location-based notifications for shopping assistance. FIG. 4 is described with respect to a software application executed by the device 100 shown in FIGS. 1A-1B; however, this and other example methods according to this disclosure are not limited to execution by only the device 100 shown in FIGS. 1A-1B, but rather may be executed by any suitable electronic device.

The method 400 begins at block 410. At block 410, the device 100 accesses a list of items for a shopping list. As discussed with respect to block 310 of the method 300 of FIG. 3, the device 100 may access or receive the shopping list in a variety of different ways. In some examples, the device 100 may access a list of items stored on a computer-readable medium within or in communication with the device 100. In some examples, the device 100 may access a list of items provided on a social networking site or from a data store provided by a cloud service provide. After accessing the list of items, the method 400 proceeds to block 420.

At block 420, the device 100 obtains a location of at least one of the items in the list as discussed above with respect to block 320 of the method 300 of FIG. 3. The method 400 then proceeds to block 430.

At block 430, the device 100 receives one or more signals from one or more sensors. For example, the device 100 may be equipped with a GPS receiver that provides one or more signals comprising location information about the device 100. In some other examples, the device 100 may comprise other sensors, such as accelerometers or gyroscopes that may provide sensor signals that the device 100 may use to determine relative movement of the device 100 to provide dead reckoning of the device's position. In some examples, the device 100 may comprise one or more wireless receivers or transceivers for receiving signals from a WiFi, cellular, or other wireless transmitter. Such receivers or transceivers may provide signals that function as sensor signals to enable the device 100 to determine its position, such as by using trilateration techniques. Alternatively, or in addition, the device 100 may receive signals via such receivers or transceivers with location information of the device 100 provided by a wireless network, such as a cellular or WiFi network.

In some examples, the device 100 may employ a camera as a sensor. For example, many smartphones include one or more cameras that can be used to capture images. While moving within a store, the device 100 may activate one or more of its cameras and analyze images captured by the camera to detect items within the image that are on the shopping list. In some examples, the device 100 may comprise a NFC, Bluetooth, RFID, or other short-range communication device that can scan signals emanating from items or shelving units equipped with compatible technology, such as one or more RFID tags or an NFC or Bluetooth transceiver. For example, a store may equip one or more shelving units with short-range NFC or Bluetooth transceivers that can connect with one or more device 100 to provide information regarding items located on the shelf. Further, an address of such a transceiver, or information provided by the transceiver, may be used by the device 100 to detect the presence of an item or determine the relative location of the device 100 within the store or within an aisle of the store. For example, if the store assigns identification numbers to one or more transceivers on shelving units within the store, a connection with a particular transceiver may indicate the identification number or may indicate an aisle/department/floor/etc. of the store or shopping area and the device 100 may use such information to determine its approximate location. Still further techniques may be employed to receive one or more sensor signals from one or more of the device's sensors. After receiving the sensor signals, the method 400 proceeds to block 440.

At block 440, the device 100 determines its location. As discussed above with respect to block 430, the device 100 may receive signals from a variety of sensors. In some examples, the device 100 may receive location information from a sensor such as a GPS receiver, which may provide an absolute position on the earth. Other types of sensors may provide information to enable the device 100 to determine a position within a store or location, such as within an aisle, department, or floor. The device 100 may employ sensor signals from WiFi or other wireless communication signals to determine a location within a layout of a store.

For example, the device 100 may obtain a map of a store's layout from a website associated with the store that comprises locations of departments, shelving units, kiosks, etc., in a coordinate system specific to the store. Such a coordinate system may be a two or three-dimensional Cartesian coordinate system, or other type of coordinate system appropriate for a particular store. The device 100 may then receive location information associated with one or more WiFi hotspots within the store to enable the device 100 to determine its location in the store using trilateration techniques based on a known location of the WiFi hotspots and the store's layout.

In some examples, as described above, the device 100 may comprise a camera which captures images while the device 100 is within the store. The device 100 may recognize one or more landmarks within the store based on one or more captured images. Further, the store may provide visual indicators configured to be recognized by such a device 100, that may comprise QR codes, text, or colored icons that indicate different locations within the store. Upon recognizing such an indicator, the device 100 may determine its location as being within a particular aisle, department, or floor of the store. After determining its location, the method 400 proceeds to block 450.

At block 450, the device 100 determines its proximity to one or more items on the shopping list as described above with respect to block 330 of the method 300 of FIG. 3. If the device 100 determines it is within a threshold proximity of one or more items, the method 400 proceeds to block 460, otherwise the method 400 returns to block 430.

At block 460, the device 100 outputs a notification signal as described above with respect to block 340 of the method 300 of FIG. 3. After completing the processing at block 460, the method 400 returns to block 430.

Figure 5:
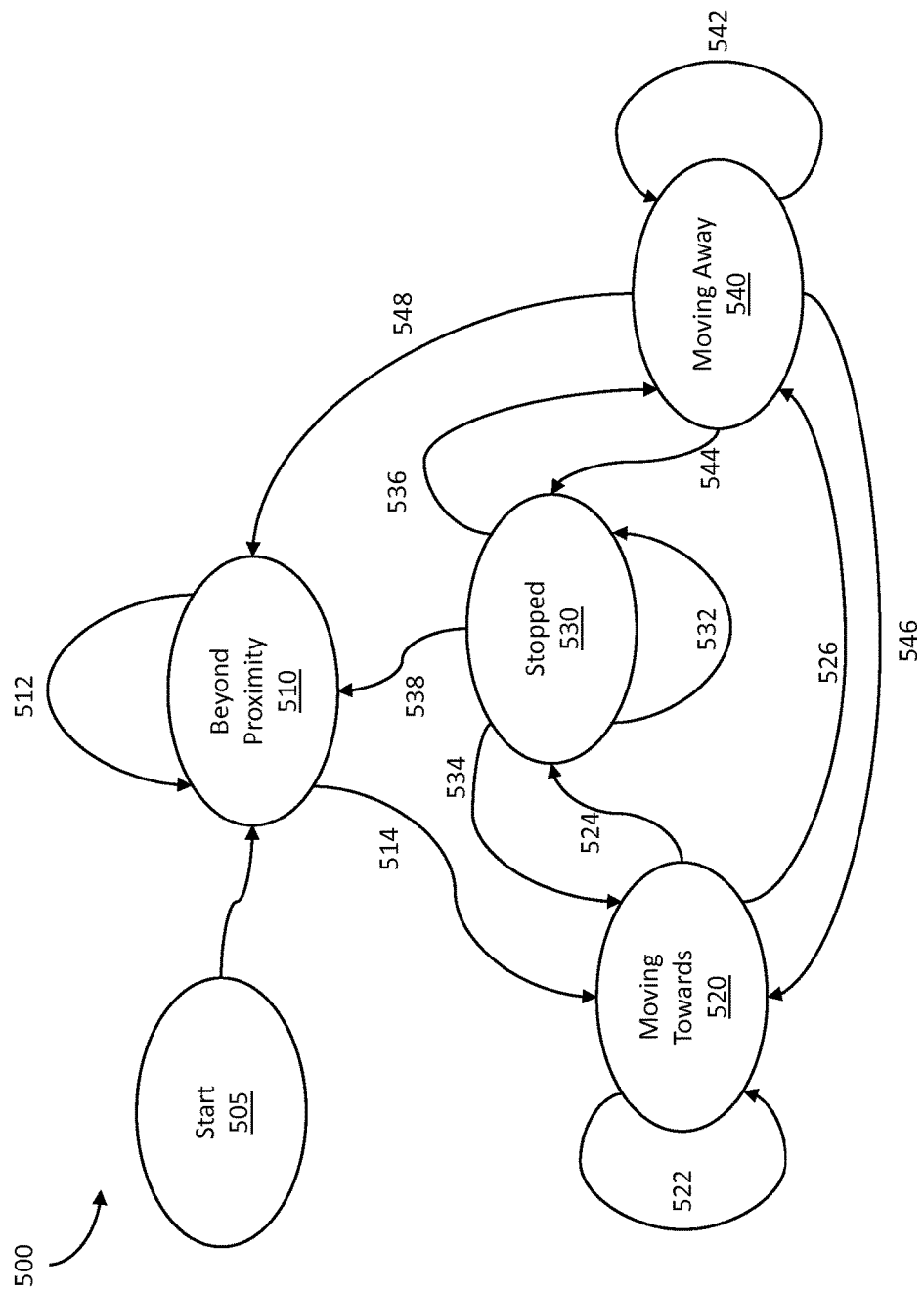
FIG. 5 shows an example state machine for location-based notifications for shopping assistance.

Referring now to FIG. 5, FIG. 5 shows an example state machine 500 for location-based notifications for shopping assistance. FIG. 5 is described with respect to a software application executed by the device 100 shown in FIGS. 1A-1B; however, this and other example state machine according to this disclosure are not limited to execution by only the device 100 shown in FIGS. 1A-1B, but rather may be executed by any suitable electronic device.

The state machine 500 of FIG. 5 illustrates an example configuration of a state machine 500 for use within or by a software application, device, or system according to this disclosure. The states shown in FIG. 5, and the transitions between states, are not intended to be limiting, but only to provide examples to assist understanding of the present disclosure.

Example state machines according to this disclosure may be employed in conjunction with methods according to this disclosure to provide location-based notifications for shopping assistance. For example a state machine may be associated with a shopping list and be used to generate notifications according to the state or change of state of the device 100 as the user moves within a store or shopping location. When the device 100 first executes an example software application, the software application may initialize a state machine and associated it with a shopping list or an item or items in the shopping list.

In some examples, the state machine 500 may not correspond to any particular item, but instead, the state machine 500 may initialize to the Beyond Proximity state 510 and check a proximity of the device 100 to an item on the list. Upon detecting a first item within sufficiently-close proximity to the device 100, the state machine may then be associated with the first item. In some related examples, upon associating the state machine with an item, the device 100 may instantiate a second state machine unassociated with any item on the list. The second state machine may then later be associated with a second item on the list, different from the first item, and, if the first state machine has not been deallocated, the two state machines may operate substantially simultaneously. At a later time, when the device 100 determines that an item on the list has been obtained, the item may be inactivated in the list or deleted from the list, and an associated state machine may be disabled, deallocated, or reassigned.

The example state machine 500 of FIG. 5 comprises four states: a Start state 505, a Beyond Proximity state 510, a Moving Towards state 520, a Stopped state 530, and a Moving Away state 540. The states in this example represent a state of the phone with respect to an item on a shopping list. In some examples, each item on the shopping list may have a corresponding state machine 500. In some examples, additional or different states may be used. For example, some state machines may comprise idle states, initialize states, states based on degrees of relative motion (e.g., based on speed, approach angle, inferred or identified method of travel, etc.), etc.

The following discussion of the state machine 500 describes an example in which the state machine 500 is associated with one item on a shopping list. Though as discussed above, state machines according to this disclosure may be associated with no items, or may be associated with a plurality of items or all items on a shopping list.

In this example, the Start state 505 is the initial state of the state machine 500 upon initialization. The Start state 500 may be where the device 100 initializes an association between the state machine 500 and one or more items on a shopping list or may provide other initialization functions. Upon completion of any initialization functionality, the state machine 500 transitions to the Beyond Proximity state 510. In this example, the state machine 500 transitions to the Beyond Proximity state 510 before any determinations as to proximity of the device 100 to any item on the shopping list occurs. However, in some examples, the state machine 500 may transition from the Start state 505 to any of the other states based on a determined proximity of the device 100 to one or more items on the shopping list or movement of the device 100.

The Beyond Proximity state 510 is associated with a condition of the device 100 being outside a threshold proximity of the associated item on a shopping list. In this example, the Beyond Proximity state 510 is also the initial state of the state machine 500. Thus, as the device 100 executes a software application according to the present disclosure, in one example, the device 100 may determine its proximity to the item. If the device 100 is not within a first threshold proximity of the item, the state machine 500 follows transition 512 to remain at the Beyond Proximity state 510. But if the device 100 determines that it is within a first threshold proximity of the item, the state machine 500 follows transition 514 to the Moving Toward state 520.

In this example state machine 500, when transitioning from the Beyond Proximity state 510 to another state, the device 100 assumes that the transition results from the device 100 moving towards the item. However, in some examples, the device 100 may determine a direction of a movement vector of the device 100 and compare it with a vector indicating movement with respect to the item from the device 100. Depending on an approach angle between the movement vector on the heading vector to the item or a speed being below a speed threshold, the state machine 500 may transition to a different state. For example, if the state machine 500 is in the Beyond Proximity state 510 and determines that an approach angle to the associated item is between 90 and 270 degrees, the state machine may transition to the Moving Away state 540. Such a transition may occur in an example wherein the device 100 checks proximity to one or more items at a relatively slow rate such that the device 100 may have sufficient time to move within sufficiently-close proximity to the item, but travel far enough that the next proximity check is made only after the device 100 has passed the item. Similarly, a transition from the Beyond Proximity state 510 to the Stopped state 530 may occur if between successive proximity checks, the device 100 moves to a point near the associated item or items and stops moving. In some examples, additional transitions from the Beyond Proximity state 510 to other state may be provided to provide appropriate state transitions in the event of one or more failures of a proximity detection determination.

In this example, at transition 514, the device 100 generates a notification signal and outputs the notification signal to cause the user device 100 to output a notification. In this example, the device 100 generates a haptic signal and outputs the haptic signal to a haptic output device 140 or 190. For example, the device 100 may output a haptic effect to a housing of the device or to a touchscreen of the device. In some examples, the device 100 may cause a haptic effect to be output to an implement, such as a cart or handles on a cart, that is in communication with the device 100. In some examples, the device 100 may instead (or in addition), generate an audio signal output it to the speaker 170, or may generate a video signal and output it to the display 120 or one or more LEDs or other lights as discussed above with respect to the methods of FIGS. 3 and 4. In other examples, the device 100 may not output a notification signal at transition 514.

The Moving Towards state 520 is associated with a state of the device 100 corresponding to being within a first threshold proximity of the item and also travelling towards the item. Thus, a determined position of the device 100 is within a first threshold proximity of the item and an approach angle to the item with respect to the device 100 is less than 90 degrees (or greater than 270 degrees, depending on the angle calculation employed). In some examples, the edge condition of precisely 90 degrees may be associated with the Moving Towards or Moving Away states 520, 540

(or both, depending on the then-present state of the state machine 500) in some examples.

While in the Moving Towards state 520, the device 100 continues to determine its proximity to the item and to determine movement vectors of the device 100 and approach angles towards the item. While the device 100 remains within a first threshold proximity to the item and the approach angle continues to indicate movement towards the item, the device 100 follows transition 522 and remains in the Moving Towards state 520. However, if the device 100 determines that the approach angle has changed such at it indicates movement away from the item, the state machine 500 follows transition 526 to the Moving Away state 540. Alternatively, the device 100 may determine that a movement speed drops below a threshold speed, or that one or more movement vectors indicate the user is moving within a small area, and the state machine 500 follows transition 524 to the Stopped state 530.

In this example, transition 522 is not associated with any notifications; however, in some examples, transition 522 may be associated with one or more notifications, such as discussed above with respect to the methods of FIGS. 3 and 4.

While executing transition 524, in this example, the device 100 generates and outputs a notification. For example, the device 100 may output one or more of a haptic, audio, or visual notification. In addition, while executing transition 526, in this example, the device 100 generates and outputs a notification. For example, the device 100 may output one or more of a haptic, audio, or visual notification. However, in other examples, the device 100 may not provide any notifications when executing transitions 524 or 526.

While in the Stopped state 530, the device 100 continues to monitor its proximity to the item and a movement vector. In some examples, the Stopped state 530 is associated with the device 100 being substantially stationary. In some examples, however, the Stopped state 530 may be associated with small changes of an approach angle indicating movement toward and movement away from the item. Such a pattern may indicate that a user of the device 100 is perusing a section of a shelving unit or other display, such as to locate the item amongst multiple displayed items. Thus, while the user is moving, the movement is centered around an approximate location of the item, but may vary between indicating moving toward and moving away from the item, and thus the device 100 may interpret such motion as corresponding to a Stopped state 530.

While the device 100 continues to determine that it is in a stopped state, the state machine 500 follows transition 532, however, if the device 100 determines that it has transitioned from a stopped state, the state machine 500 may transition to the Moving Towards state 520 or Moving Away state 530. Transitions to one of these states may be further based on a determined proximity to the item. In one example, if the proximity is not within a second proximity threshold, the device 100 may determine that it is unlikely that the user has obtained the item. Thus, in one example, if the device 100 is within a first proximity threshold of the item, but not within a second proximity threshold of the item, the state machine 500 may follow one of transitions 534 or 536. However, if the device 100 determines that it is within both the first and second proximity thresholds, the device 100 may determine that it is likely the user has obtained the item and may transition to the Beyond Proximity 510 state and determine a new item to associate with the state machine 500, or terminate the state machine 500. In some examples, the device 100 may be coupled to a cart that is equipped with one or more sensors, such as a weight or pressure sensor. In one such example, the cart or the sensor(s) may be configured to provide an indication to the device 100 to indicate that an item has been placed in the cart. For example, if a user stops near an item on the shopping list, and the cart detects that a weight of items within the cart has increased, the cart may transmit a signal to the device 100 indicating the increase in weight. In some examples, the cart may be configured to associate weights with particular items such that, in response to receiving the sensor signal from the cart, the device 100 may provide an indication of the item on the shopping list, and the cart may provide a confirmation, based on weight of the item added to the cart, that the indicated item was added to the cart. Or in some examples, the device 100 may be able to access information about the item, such as a weight of the item, and, in response to receiving a signal from the cart or one or more sensors, determine whether the item added to the cart is the item on the shopping list based on the weight.

In some examples, transitions 534 and 536 may not be provided by the state machine 500. Thus, if the device 100 enters the Stopped state 530, the only available transition may be to the Beyond Proximity state 510 to identify a new item on the shopping list or to terminate the state machine 500. Alternatively, in some examples, rather than using a second proximity threshold, the device 100 may employ a timer and determine whether the device 100 remained within the Stopped state for greater than a threshold duration. If so, the state machine 500 follows transition 538 upon detecting movement of the device 100, otherwise, the state machine 500 follows one of transitions 524 or 536 depending on an angle of approach to the item.

Any or all of transitions 532-538 may be associated with one or more of a haptic, audible, or visual notification, or may not be associated with any notifications as discussed above with respect to the methods of FIGS. 3 and 4.

While in the Moving Away state 540, the device 100 continues to monitor its proximity to the item and a movement vector. If the device 100 moves beyond a first threshold proximity to the item, the state machine 500 follows transition 548 to the Beyond Proximity state 510. However, while the device 100 remains within the first threshold proximity and an angle of approach remains between approximately 90 and 270 degrees, the state machine 500 follows transition 542. If the angle of approach transitions to less than 90 degrees or greater than 270 degrees, the state machine 500 transitions to the Moving Towards state 520 along transition 546. Alternatively, the device 100 may determine that a movement speed drops below a threshold speed, or that one or more movement vectors indicate the user is moving within a small area, and the state machine 500 follows transition 544 to the Stopped state 530.

Any or all of transitions 542-548 may be associated with one or more of a haptic, audible, or visual notification, or may not be associated with any notifications as discussed above with respect to the methods of FIGS. 3 and 4.

Device 100 may continue to execute the state machine 500 until an item associated with the state machine 500 is obtained, the user disables the software application, the device 100 determines that it has left a store or other shopping area, or other event occurs.

Referring now to FIG. 6, FIG. 6 shows an example method 600 for location-based notifications for shopping assistance. FIG. 6 is described with respect to a software application executed by the device 100 shown in FIGS. 1A-1B and the system shown in FIG. 2; however, this and other example methods according to this disclosure are not limited to execution by only the example device 100 shown in FIGS. 1A-1B or example system 200 shown in FIG. 2, but rather may be executed by any suitable electronic device or system.

At block 610, the system 200 identifies a device 100. For example, the system 200 may communicatively couple to a device 100, such as by a WiFi connection, a Bluetooth connection, NFC connection, or other wireless communication mechanism. Such a communication mechanism may have a range of the entire location, or may be a short-range device, such as having a range of a few meters. In some examples, a user may connect a device 100 to a shopping cart, or may use a device pre-installed on a shopping cart. After the system 200 has identified the device, 100, the system 200 may maintain a record of the presence of the device for a period of time, such as while the device 100 is in communication with the system 200, or for a period of time following a last communication with the device 100. After the system 200 identifies the device 100, the method proceeds to block 620.

At block 620, the system 200 requests a list of items from the device 100. For example, the system 200 may request the entire shopping list from the device, or may only request certain types of items from a shopping list. In one example, the device 100 may be configured to automatically transmit a shopping list, or a portion of the shopping list, to the system 200, or may provide the user with the option of accepting or denying the request. In some examples, the system 200 may instead provide an interface to allow the user to enter one or more items on a shopping list. For example, a shopping cart provided by a retail store may comprise a device 100 that is in communication with an example system 200 in place at the retail store. The user may login to the device 100, such as by using a login name and password associated with a user account with the store, or may use a fidelity card, a credit card, a debit card, or other identifying mechanism. The user may then be presented with a user interface to enable the user to enter one or more items into a shopping list, or to couple the device 100 with the user's smartphone, tablet, removable storage device, or to access a cloud storage location having a shopping list. After obtaining part or all of a shopping list, the method 600 proceeds to block 630.

At block 630, the system 200 identifies one or more items on the shopping list that are available at the location. For example, a retail store may employ an example system 200 that is able to compare items on a shopping list with records stored in an inventory management system to identify one or more items on the shopping list that are available within the store. In some examples, if one or more items on the shopping list are available in stock, but have not yet been moved from inventory out into the shopping area, the system 200 may provide a notification to one or more devices within the store to indicate that a shopper may be looking for an item that is not on the shelves, but is available in inventory. Such a notification may cause one or more employees to stock the shelves with such items. In some examples, the system 200 may provide a notification to the device 100 that one or more items are in stock but are not on the shelves and must be requested from inventory, or that may be available from other stores of the same chain within the area. After identifying one or more available items on the shopping list, the method proceeds to block 640.

At block 640, the system 200 determines the device's location. For example, the device 100 may determine its own location, such as according to examples described above, and may provide the location information to the system, 200. In some examples, the system 200 may determine the device's location based on one or more received signals from a wireless station 230*a*-*c*, such as by using triangulation. In some examples, the system 200 may comprise one or more short range beacons, sensors, or other wireless devices that are configured to detect a device 100 in proximity, to identify the device 100, and provide a location of the device to the system. For example, the system 200 may employ Bluetooth beacons, infrared beacons, NFC beacons, or other sensors to detect the presence of a device 100 within proximity of the beacon. In some examples, the system 200 may determine the device's position and orientation, such as its heading, or a direction and speed of travel. Thus, in some examples, proximity may comprise a location, an orientation, a speed, or a velocity. The method 600 then proceeds to block 650.

At block 650, the system 200 determines whether the device 100 is in proximity to one or more items on the shopping list, such as by using one or more techniques described above with respect to blocks 330 or 450 of methods 300 or 400, respectively. The method 600 then proceeds to block 660.

At block 660, the system 200 generates and outputs a notification signal to the device 100 that is configured to cause the device to output one or more notifications. For example, the system 200 may generate and transmit one or more signals indicating an identifier of the item (or items), a distance to the item(s), and a direction to the item(s). The device 100 may receive the signal and generate one or more notifications as described above with respect to blocks 340 or 460 of methods 300 or 400, respectively. The method 600 then returns to block 610, where it may identify another device, or to block 640 to update the device's location.

It should be noted that the method 600 of FIG. 6 may be executed many times in parallel or sequence with respect to one or more devices. Thus, a system 200 may be capable of managing a plurality of different devices within the store, and may execute an instance of the method 600 with respect to one or more devices 100 substantially simultaneously.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor.

Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation. Further, use of the labels "first" and "second" may be used in the examples of this disclosure to indicate cardinality, not ordinality, depending on context.

That which is claimed is:

1. A method comprising:
   receiving, by a user device, a list of items for a shopping list;
   requesting, by the user device from a remote computing device, a location of at least one of the items in the shopping list within a store;
   receiving, by the user device from the remote computing device, the location of the at least one of the items;
   guiding a user of the user device to a first item in the shopping list, comprising iteratively:
      determining, by the user device, a location of the user device within the store based on a received sensor signal;
      determining, by the user device, a movement vector associated with the user device and an approach angle to at least one item on the shopping list based on the movement vector, wherein the movement vector indicates a direction and movement speed of the user device;
      responsive to a determination by the user device that a proximity of the user device to the location of the at least one item is within a threshold proximity and a determination by the user device to generate a haptic effect based on the movement vector:
         generating, by the user device, a notification signal based on the proximity of the user device to the location of the at least one item and the approach angle, wherein the notification signal comprises a haptic signal; and
         outputting, by the user device, the haptic signal to cause the user device to output a haptic effect;
      determining the user has likely obtained the first item; and
      terminate guiding the user to the first item in the shopping list.

2. The method of claim 1, wherein generating the haptic signal comprises determining a parameter of the haptic effect based on a magnitude of the proximity of the user device to the location.

3. The method of claim 1, wherein the haptic effect is configured to indicate a direction to the location of the at least one of the items.

4. The method of claim 1, wherein the haptic effect is configured to indicate a quantity of the at least one item to obtain.

5. The method of claim 1, wherein the user device comprises a first user device, and further comprising, subsequent to outputting the notification signal:
   receiving an input on the user device; and
   in response to receiving the input, providing additional information about the location of the at least one of the items to a second user device.

6. The method of claim 1, wherein the notification signal comprises at least one of (i) a visual signal configured to cause the user device to display a visual cue, or (ii) an audio signal configured to cause the user device to output an audible cue.

7. The method of claim 1, further comprising determining, by the user device, that the user device is within the threshold proximity based on a near-field communication or detection of an RFID tag for the at least one item.

8. The method of claim 1, further comprising determining, by the user device, that the user device is within the threshold proximity based on an image captured by a camera of the user device.

9. The method of claim 1, further comprising determining, by the user device, that the user device is within the threshold proximity based at least in part on a received WiFi signal or a received GPS signal.

10. The method of claim 1, wherein the user device comprises a wearable device.

11. The method of claim 10, wherein the wearable device comprises one of a virtual reality headset, a wristwatch device, or an earpiece device.

12. The method of claim 1, receiving the list of items comprises receiving the list of items using at least one of a near-field communication, a Bluetooth communication, or a Wi-Fi communication.

13. The method of claim 1, wherein the user device comprises a smartphone.

14. The method of claim 1, wherein determining the user has likely obtained the first item is based on a determined proximity to the first item and a first proximity threshold.

15. The method of claim 1, wherein determining the user has likely obtained the first item comprises receiving a sensor signal from a sensor indicating an item has been added to a shopping cart or shopping basket.

16. A device comprising:
   a non-transitory computer-readable medium;
   a sensor configured to output sensor signals;
   a haptic output device; and
   a processor in communication with the non-transitory computer-readable medium and the haptic output device, the processor configured to execute processor executable code stored in the non-transitory computer-readable medium to:
access a list of items for a shopping list;
request a location of at least one of the items in the shopping list from a remote computing device;
receive the location of the at least one of the items from the remote computing device;
guide a user to a first item in the shopping list by executing processor executable code stored in the non-transitory computer-readable medium to, iteratively:
  determine a location of the device based at least in part on a sensor signal received from the sensor;
  determine a movement vector of the device and an approach angle to at least one item on the shopping list based on the movement vector, wherein the movement vector indicates a direction and movement speed of the device;
  in response to a determination that a proximity of the device to the location of the at least one of the items is within a threshold proximity based on the determined location of the device and a determination to generate a haptic effect based on the movement vector:
    generate a haptic signal based on the proximity of the device to the location of the at least one of the items and the approach angle; and
    transmit the haptic signal to the haptic output device to cause the haptic output device to output a haptic effect;
  determine the user has likely obtained the first item; and
  terminate guidance to the user to the first item in the shopping list.

17. The device of claim 16, wherein the device is affixed to a shopping cart or a shopping basket.

18. The device of claim 16, wherein the processor is further configured to execute processor executable code stored in the non-transitory computer-readable medium to determine the user has likely obtained the first item based on a determined proximity to the first item and a first proximity threshold.

19. The device of claim 16, wherein the processor is further configured to execute processor executable code stored in the non-transitory computer-readable medium to receive a sensor signal from a second sensor indicating an item has been added to a shopping cart or shopping basket, and wherein determining the user has likely obtained the first item is based on the sensor signal.

20. A non-transitory computer-readable medium comprising program code executable by a processor and configured to cause a processor to:
receive a list of items for a shopping list;
request a location of at least one of the items in the shopping list from a remote computing device;
receive the location of the at least one of the items from the remote computing device;
guide a user to a first item in the shopping list, comprising program code executable by a processor and configured to cause a processor to, iteratively:
  determine a location of the device based at least in part on a sensor signal received from a sensor;
  determine a movement vector associated with a state of a user device and an approach angle to at least one item on the shopping list based on the movement vector, wherein the movement vector indicates a direction and movement speed of the user device toward or away from the location or that the user device is substantially stationary;
  responsive to a determination that a proximity of the user device to the location is within a threshold proximity of the location and a determination to generate a haptic effect based on the movement vector:
    generate a notification signal based on the proximity of the user device to the location and the approach angle, wherein the notification signal comprises a haptic signal; and
  output the haptic signal to cause the user device to output a haptic effect;
determine the user has likely obtained the first item; and
terminate guidance to the user to the first item in the shopping list.

* * * * *